June 20, 1967 K. C. JOHNSON 3,327,248

DELAY LINES

Filed June 26, 1964 2 Sheets-Sheet 1

Inventor
K. C. JOHNSON
By
Cameron, Kerkam & Sutton
Attorneys

June 20, 1967 K. C. JOHNSON 3,327,248

DELAY LINES

Filed June 26, 1964 2 Sheets-Sheet 2

Inventor
K. C. JOHNSON
By
Cameron, Kerkam & Sutton
Attorneys

United States Patent Office 3,327,248
Patented June 20, 1967

3,327,248
DELAY LINES

Kenneth Charles Johnson, Gatley, Cheadle, England, assignor to Ferranti Limited, Hollinwood, England, a company of Great Britain, and Northern Ireland Filed June 26, 1964, Ser. No. 378,340
Claims priority, application Great Britain, June 28, 1963, 25,715/63
13 Claims. (Cl. 333—31)

This invention relates to delay lines.

Known delay lines are usually either distributed lines or lumped constant lines. Distributed lines comprise a continuous winding on a suitably conductive former or a continuous bifilar winding in which one conductor is earthed at one end and forms the capacitance of the line, the other conductor forming the inductance of the line. Lumped constant lines comprise a plurality of sections in which the inductance of each section is formed by one or more inductive windings and the capacitance of each section is formed by one or more capacitors.

Both of the above kinds of delay line normally suffer from the disadvantage that the delay time of the line can only be varied in discrete steps by the provision of tapping points on the line and continuous variation of the delay time is not possible.

It is an object of the present invention to provide a delay line which is such that the delay time may be continuously varied.

According to the present invention a delay line having inductance and capacitance comprises a first repetitive pattern of metallic elements formed on one surface of an elongated flexible sheet of electrically insulating material, a second repetitive pattern of metallic elements formed on a further surface of an elongated flexible sheet of electrically insulating material, said second pattern being superimposed on said first pattern such that each element of said second pattern is electrically insulated from and overlays at least part of an element of said first pattern, said superimposed patterns being rolled about a longitudinal axis to form a plurality of turns, said first pattern constituting the inductance of said delay line and said first and second patterns together constituting the capacitance of said delay line.

Means may be provided for varying the diameter to which said flexible sheet is rolled to vary the delay time of said delay line.

Alternatively, means may be provided for skewing the rolling of said flexible sheet to vary the delay time of said delay line.

The present invention will now be described by way of example with reference to the accompanying drawings in which.

Figure 1:
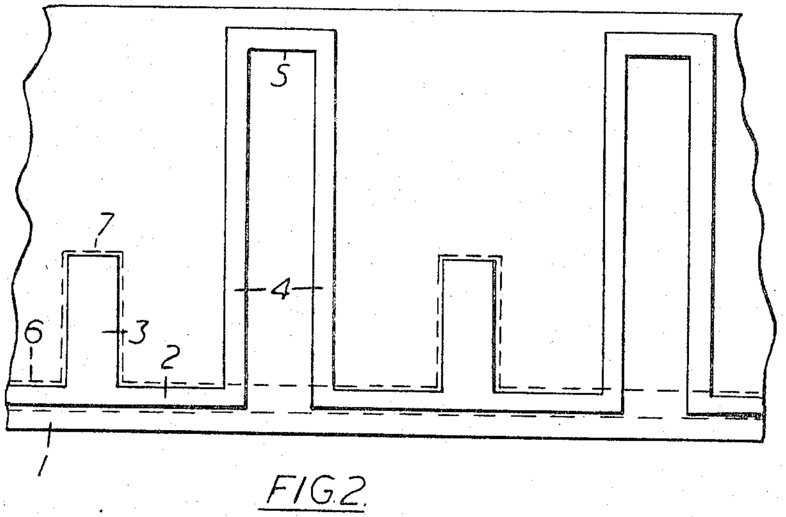
FIGURE 1 shows part of a delay line in accordance with the invention.

Referring now to FIGURE 1 of the drawings, a delay line includes an elongated flexible sheet 1 (only part of which is shown) of electrically insulating material having printed on one side a first repetitive pattern of copper elements, each element comprising a conductor 2 linking a capacitor plate 3 and two strips 4 extending perpendicular to the conductor 2 and which are joined at their ends remote from the conductor 2 by a further strip 5. On the other side of the sheet 1 there is printed a second repetitive pattern of copper elements, each element of the second pattern comprising a conductor 6 and a capacitor plate 7, both of which are shown in broken line. The capacitor plate 7 of the second pattern overlays the capacitor plate 3 of the first pattern.

The delay line is formed by rolling the strip 1 about one longitudinal edge together with a further flexible sheet of electrically insulating material (not shown) which serves to insulate the capacitor plates 3 and 7 of adjacent turns. When the sheet 1 is rolled about one longitudinal edge the strips 4 of the first pattern form mutually coupled inductances which are connected to the capacitors formed by the plates 3 and 7.

Figure 2:
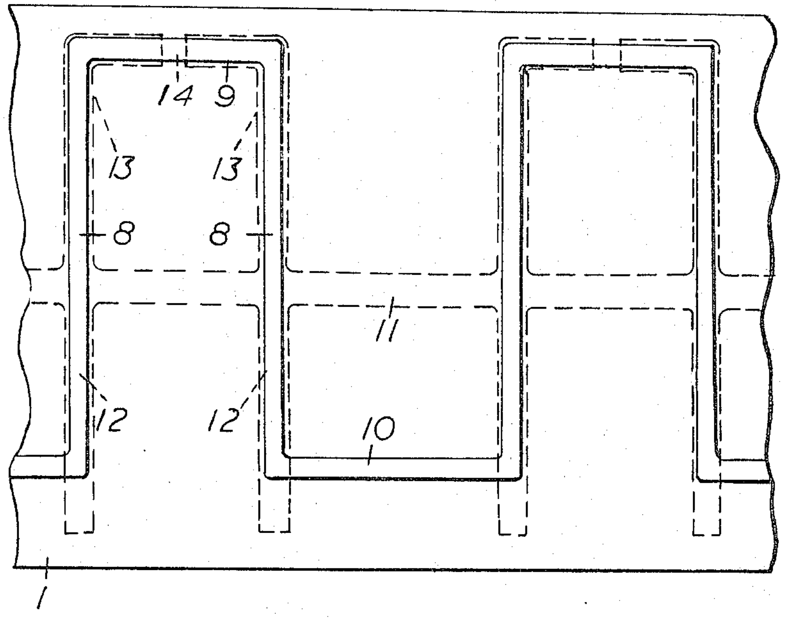
FIGURE 2 shows a modified form of the part shown in FIGURE 1.

The capacitors need not be formed separately from the inductive windings as shown in FIGURE 1. FIGURE 2 shows a modification in which the first pattern, shown in full line, comprises strips 8 extending across the sheet 1 and joined at opposite ends to adjacent strips by further strips 9, 10. The second pattern, shown in broken line, comprises a conductor 11 from which project strips 12, which overlay and extend beyond the strips 13 which overlay the strips 8 and 9 apart from a small gap 14.

Figure 3:
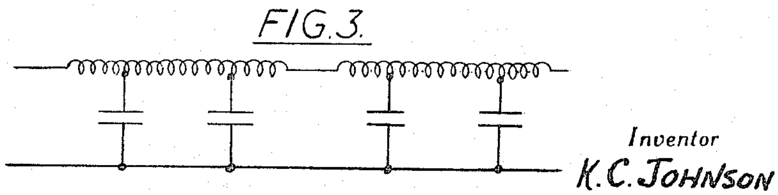
FIGURE 3 shows an equivalent circuit of the part shown in FIGURE 2.

When the sheet 1 is rolled about a longitudinal axis the strips 8 of the first pattern constitute the inductance of the line and the strips 8 of the first pattern together with the strips 12 and 13 of the second pattern constitute the capacitance of the line, the equivalent circuit being shown in FIGURE 3.

Figure 4:
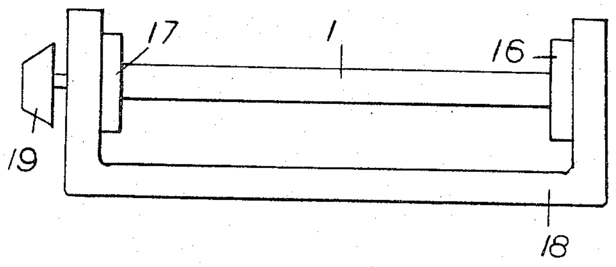
FIGURE 4 shows a complete delay line in accordance with the invention.
Figure 5:
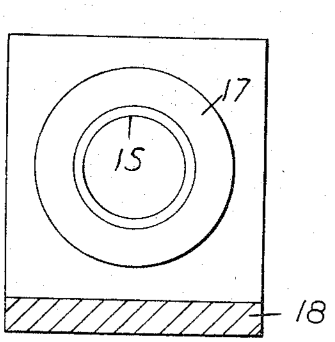
FIGURE 5 shows a view of one end of the delay line shown in FIGURE 4.

The delay time for delay lines made in accordance with the invention may be varied either by varying the diameter to which the flexible sheet 1 is rolled or by skewing the rolling of the flexible sheet. FIGURE 4 shows a completed delay line in which the flexible sheet 1 is rolled and frictionally held near each end by means of rubber rings 15 (FIGURE 5) secured to annuli 16, 17 mounted on a base 18. The annulus 16 is fixed with respect to the base 18, and the annulus 17 is rotatable by means of a knob 19. When the annulus 17 is rotated the rolling of the flexible sheet 1 is skewed, the frictional engagement between the rubber rings 15 and outer turn of the sheet 1 permitting the necessary longitudinal movement of the sheet 1.

In a typical delay line made in accordance with FIGURE 2 the strips 8 were five inches long, the combined length of the strips 12 and 13 was six inches and the length of the pattern repeat was .45 inch. The complete delay line had 45 pattern repeats and was printed on a flexible sheet of .003 inch thickness which was rolled together with a further sheet of electrically insulating material of .001 inch thickness to a diameter of .375 inch. At this diameter, with the sheet rolled straight the delay time of the line was 290 nanoseconds and the impedance of the line was 68 ohms. By skewing the rolling of the flexible sheet the delay time of the line was continuously variable down to 160 nanoseconds and with this delay time the impedance of the line was 51 ohms.

Figure 6:
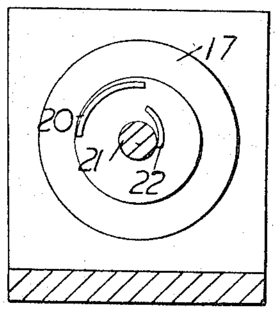
FIGURE 6 shows a modification to FIGURE 5.

If it is desired to vary the delay time of the line by varying the diameter to which the flexible sheet 1 is rolled both of the annuli 16 and 17 are mounted to be rotatable and the outer edge of the rolled sheet 1 is secured to the annuli 16 and 17 by means of leaf springs 20 (FIGURE 6). The inner edge of the rolled sheet 1 is secured to a central core 21 by means of further leaf springs 22, the core 21 being fixed with respect to the base 18.

As the annuli 16 and 17 are rotated the diameter of the rolled sheet 1 is varied, the leaf springs 20 and 22 ensuring that the outer and inner edges of the sheet 1 remain close to the adjacent turns. With the sheet 1 made as described above the delay time was variable from 290 nanoseconds at a diameter of .375 inch to 220 nanoseconds at a diameter of .75 inch, the impedance of the line remaining fairly constant at 68 ohms.

What I claim is:

1. A delay line having inductance and capacitance comprising a first continuous repetitive pattern of metallic elements formed on one surface of an elongated flexible sheet of electrically insulating material, a second continuous repetitive pattern of metallic elements formed on a further surface of an elongated flexible sheet of electrically insulating material, said second pattern being superimposed on said first pattern such that each element of said second pattern is electrically insulated from and overlays at least part of an element of said first pattern, said superimposed patterns being rolled about a longitudinal axis to form a plurality of turns, said first pattern constituting the inductance of said delay line and said first and second patterns together constituting the capacitance of said delay line and means for varying the mutual disposition of said plurality of turns to vary the delay time of said delay line.

2. A delay line as claimed in claim 1 in which said first and second patterns are formed on the two sides of a single elongated flexible sheet of electrically insulating material.

3. A delay line as claimed in claim 2 in which said single elongated sheet is rolled about a longitudinal axis together with a further flexible sheet of electrically insulating material to form said plurality of turns.

4. A delay line as claimed in claim 1 including means for varying the diameter to which said flexible sheet is rolled to vary the delay time of said delay line.

5. A delay line as claimed in claim 1 including means for skewing the rolling of said flexible sheet to vary the delay time of said delay line.

6. A delay line as set forth in claim 1 wherein at least one of said patterns is of castillated form.

7. A delay line as set forth in claim 1 wherein the inductance of said delay line is formed by metallic elements of said first pattern, and the capacitance of said delay line is formed by metallic elements of said second pattern and by said metallic elements of said first pattern which form tthe inductance of the delay line.

8. A delay line as set forth in claim 1 wherein the inductance of said delay line is formed by metallic elements of said first pattern, and the capacitance of said delay line is formed by metallic elements of said second pattern and by metallic elements of said first pattern separate from said metallic elements which form the inductance of the delay line.

9. A delay line having inductance and capacitance comprising a first continuous repetitive pattern of metallic elements formed on one surface of an elongated flexible sheet of electrically insulating material, a second continuous repetitive pattern of metallic elements formed on a further surface of an elongated flexible sheet of electrically insulating material, said second pattern being superimposed on said first pattern such that each element of said second pattern is electrically insulated from and overlays at least part of an element of said first pattern, said superimposed patterns being rolled about a longitudinal axis to form a plurality of turns, said first pattern constituting the inductance of said delay line and said first and second patterns together constituting the capacitance of said delay line and means for varying the diameter to which said flexible sheet is rolled to vary the delay time of said delay line, said means for varying the diameter to which said flexible sheet is rolled comprising two annular end rings axially rotatable with respect to a fixed base, said rolled flexible sheet being mounted between said end rings and having its outer turn attached to said end rings and its inner turn attached to a rod fixed with respect to said base.

10. A delay line having inductance and capacitance comprising a first continuous repetitive pattern of metallic elements formed on one surface of an elongated flexible sheet of electrically insulating material, a second continuous repetitive pattern of metallic elements formed on a further surface of an elongated flexible sheet of electrically insulating material, said second pattern being superimposed on said first pattern such that each element of said second pattern is electrically insulated from and overlays at least part of an element of said first pattern, said superimposed patterns being rolled about a longitudinal axis to form a plurality of turns, said first pattern constituting the inductance of said delay line and said first and said second patterns together constituting the capacitance of said delay line and means for skewing the rolling of said flexible sheet to vary the delay time of said delay line, said means for skewing the rolling of said flexible sheet comprising a pair of annular end rings each having an inner surface adapted to frictionally grip the outer surface of said rolled flexible sheet, said end rings being mounted on a fixed base such that one of said end rings is fixed with respect to said base and the other of said end rings is axially rotatable with respect to said base.

11. A delay line having inductance and capacitance comprising a first continuous repetitive pattern of metallic elements formed on one surface of an elongated flexible sheet of electrically insulating material, a second continuous repetitive pattern of metallic elements formed on a further surface of elongated flexible sheet of electrically insulating material, said second pattern being superimposed on said first pattern such that each element of said second pattern is electrically insulated from and overlays at least part of an element of said first pattern, said superimposed patterns being rolled about a longitudinal axis to form a plurality of turns, said first pattern constituting the inductance of said delay line and said first and second patterns together constituting the capacitance of said delay line, said first pattern of metallic elements formed on one surface of an elongated flexible sheet comprising a conductor disposed along the longitudinal axis of said flexible sheet and pairs of conductor strips disposed transverse thereto, said conductor strips of each pair being joined at one end to said conductor and joined at the other end remote from said conductor to each other by a further strip, and said second pattern of metallic elements formed on a further surface of an elongated flexible sheet comprising a conductor disposed along the longitudinal axis of said flexible sheet and pairs of conductor strips disposed transverse thereto, said conductor strips of each pair being joined at one end to said conductor and spaced from each other at the other end remote from said conductor.

12. A delay line having inductance and capacitance comprising a first continuous pattern of metallic elements formed on one surface of an elongated flexible sheet of electrically insulating material, a second continuous repetitive pattern of metallic elements formed on a further surface of an elongated flexible sheet of electrically insulating material, said second pattern being superimposed on said first pattern such that each element of said second pattern is electrically insulated from and overlays at least part of an element of said first pattern, said superimposed patterns being rolled about a longitudinal axis to form a plurality of turns, said first pattern constituting the inductance of said delay line and said first and second patterns together constituting the capacitance of said delay line, said first pattern of metallic elements formed on one surface of an elongated flexible sheet comprising a conductor disposed along the longitudinal axis of said flexible sheet and conductive means disposed transverse thereto including alternately spaced plate elements and conductor strips, said conductive means being joined to said conductor, said conductor strips forming inductive windings, and said second pattern of metallic elements formed on a further surface of an elongated flexible sheet comprising a conductor disposed along the longitudinal axis of said flexible sheet and having spaced plate elements disposed transverse thereto, said last named spaced plate elements being joined to said last named conductor, said plate elements of said first and said second patterns being disposed for cooperation with each other to form capacitance elements.

13. A delay line as set forth in claim 12 wherein each inductive winding comprising a pair of conductor strips joined at their ends remote from said conductor by a further conductor strip.

References Cited

UNITED STATES PATENTS

| | | | |
|---|---|---|---|
| 2,832,935 | 4/1958 | Tank | 333—70 |
| 2,915,716 | 12/1959 | Hattersley | 333—84 |
| 3,013,227 | 12/1961 | Jordan | 333—84 |
| 3,114,121 | 12/1963 | Jordan | 333—29 |
| 3,163,833 | 12/1964 | Burson | 333—79 |
| 3,163,834 | 12/1964 | Malmstrom | 333—79 |
| 3,173,111 | 3/1965 | Kallam | 333—31 |
| 3,249,854 | 5/1966 | Nevius | 323—108 |

HERMAN KARL SAALBACH, *Primary Examiner.*

C. BARAFF, *Assistant Examiner.*